(12) United States Patent
Zhou et al.

(10) Patent No.: US 10,897,421 B2
(45) Date of Patent: Jan. 19, 2021

(54) METHOD OF PROCESSING A DATA PACKET RELATING TO A SERVICE

(71) Applicant: ORANGE, Paris (FR)

(72) Inventors: Yu Zhou, Issy less Moulineaux (FR); Ruan He, Issy less Moulineaux (FR)

(73) Assignee: ORANGE, Paris (FR)

( * ) Notice: Subject to any disclaimer, the term of this patent is extended or adjusted under 35 U.S.C. 154(b) by 0 days.

(21) Appl. No.: 15/306,992

(22) PCT Filed: Apr. 13, 2015

(86) PCT No.: PCT/FR2015/050987
§ 371 (c)(1),
(2) Date: Oct. 26, 2016

(87) PCT Pub. No.: WO2015/166158
PCT Pub. Date: Nov. 5, 2015

(65) Prior Publication Data
US 2017/0054639 A1 Feb. 23, 2017

(30) Foreign Application Priority Data

Apr. 30, 2014 (FR) ..................................... 14 53999

(51) Int. Cl.
*H04L 12/741* (2013.01)
*H04W 92/02* (2009.01)
(Continued)

(52) U.S. Cl.
CPC ............ *H04L 45/745* (2013.01); *H04L 12/66* (2013.01); *H04L 45/306* (2013.01); *H04W 92/02* (2013.01); *H04W 76/12* (2018.02)

(58) Field of Classification Search
CPC ...... H04L 45/745; H04L 12/66; H04W 76/12; H04W 92/02
See application file for complete search history.

(56) References Cited

U.S. PATENT DOCUMENTS 9,473,570 B2 * 10/2016 Bhanujan ............ H04L 67/1002
2012/0281540 A1 * 11/2012 Khan .................... H04L 45/308
370/241
(Continued)

FOREIGN PATENT DOCUMENTS

WO 0048365 A1 8/2000

OTHER PUBLICATIONS

Attached please find the Written Opinion for the PCT/FR2015/050987.
(Continued)

*Primary Examiner* — Hassan Kizou
*Assistant Examiner* — Hector Reyes
(74) *Attorney, Agent, or Firm* — Haverstock & Owens LLP

(57) ABSTRACT

Method of processing a data packet relating to a service, said packet being conveyed by an interconnection gateway between a mobile communication network and a packet communication network, destined for said packet communication network The method comprises a step of obtaining by a virtualized node an identifier of the service to which the packet relates and a step of obtaining on the basis of the service identifier a sequence of at least one elementary network function for processing said packet The packet is transmitted to a virtualized node in order to apply the current function and if there exists a function following the current function in the sequence selection of selecting a next virtualized node able to implement said following function. If no function following the current function in the sequence exists, the virtualized node transmits the output packet to the packet communication network.

13 Claims, 4 Drawing Sheets

(51) Int. Cl.
*H04L 12/725* (2013.01)
*H04L 12/66* (2006.01)
*H04W 76/12* (2018.01)

(56) References Cited

U.S. PATENT DOCUMENTS

2015/0195197 A1* 7/2015 Yong .................. H04L 45/74
370/392
2015/0263901 A1* 9/2015 Kumar ................ H04L 41/12
370/254

OTHER PUBLICATIONS

Park, Hosung, "Hop-by-hop Control for Reliable Data Dissemination in Wireless Sensor Networks", Department of Computer Engineering, pp. 6.

* cited by examiner

| NF_Id | VM_Id |
|---|---|
| 40 | 41, 42, 43 |
| 50 | 51 |
| 60 | 61, 62, 63 |

| NF_Id | VM_Id |
|---|---|
| 60 | 61, 62, 63 |

METHOD OF PROCESSING A DATA PACKET RELATING TO A SERVICE

The invention pertains to the general field of telecommunications. It relates more particularly to the processing of a data packet relating to a service in a mobile communication network.

A mobile communication network allows a user terminal to access data packet communication networks (Packet Data Network in English) such as the Internet network. The interconnection between a mobile communication network and a data packet communication network is ensured by interconnection gateways. In a UNITS network such a gateway is called a GGSN gateway (for Gateway GPRS Support Node). This gateway makes it possible more precisely to transmit the traffic relating to a PDP (for Packet Data Protocol) session between a user terminal with which an IP address is associated and a 115 packet communication network identified by an APN (for Access Point Name). The session is materialized by a PDP context consisting of a set of information comprising the PDP address associated with the user terminal, the APN, an item of information relating to the protocol used (i.e. IPv4 for Internet Protocol version 4 or IPv6 for Internet Protocol version 6), and a quality-of-service profile. The function of the interconnection gateway is also to translate the APN identifying the packet switching network into an IP (for Internet Protocol) address and to manage the PDP context. In an equivalent manner for an EPS network, interconnection with a packet communication network is ensured by an interconnection P-GW gateway (for Packet Data Network Gateway) ensuring the same functions as the GGSN gateway. Just as the PDP context makes it possible to characterize a session between a user terminal and a packet communication network, in an EPS network the session is characterized by a virtual connection called an "EPS bearer".

The interfaces between user terminals, access network, and core network of a mobile communication network have been specified by the 3GPP (for 3rd Generation Partnership Project) standards group. However, the interfaces between the mobile communication network and the packet communication networks external to the mobile communication network (Gi interface for a 2G/3G network and SGi interface for a 4G network) are not. There does not therefore exist any standardized implementation of these interfaces and a mobile communication network operator is liable to deploy various network infrastructures dedicated for a type of client (e.g. virtual mobile network, private company operator), or can also choose to deploy one and the same network infrastructure shared by several types of client. This tends to complicate the management of these interfaces from an operational point of view and in terms of maintenance.

Moreover, when one and the same mobile communication network is deployed for several clients of one and the same operator, the interconnection gateways are in fact connected to the packet communication networks of these clients (e.g. Internet, virtual private network, virtual mobile network operator network). The interconnection gateways then use the APN, to distinguish the packet communication networks which a user terminal can access from the network of the mobile communication network operator. For each APN, a gateway has in particular an associated network path. These network paths are furthermore configured in such a way that a set of elementary network functions is implemented by the mobile communication network operator so that a service of a packet communication network can be provided at the request of a user terminal. These network paths thus constitute ordered series of elementary network functions, or sequence of elementary network functions, implemented in the network of the mobile communication network operator for a given service. These elementary network functions are defined as the set of functions provided by a mobile communication network operator so as to process a data packet sent from an interconnection gateway to a network of a service provider. These elementary network functions are for example network address translation services, firewall services, load distribution services, transcoding services, caching services, request-optimization services, network packet enrichment services, etc.

Management of the interconnection according to the procedures known from the prior art comprises drawbacks, however. The configuration of the APNs is static. The sequence of elementary network functions which is associated with an APN is fixed, whilst the elementary network functions required differ according to the service requested. Moreover, offering the same elementary network functions for various services of one and the same APN does not allow optimized error management. When an elementary network function of a sequence of elementary network functions which is associated with an APN may not be implemented following for example a failure of the network, the set of services accessible through this APN may be affected thereby, including the services that do not need this elementary network function. Furthermore, the sequence of elementary network functions that is associated with an APN may not be modified once defined. Physical resources are in particular allocated for certain elementary network functions which will be implemented only for certain services. In particular, this results in a needless network overload.

One of the aims of the invention is to remedy inadequacies/drawbacks of the prior art and/or to afford improvements thereto.

According to a first aspect the invention relates to a method of processing a data packet relating to a service, the packet being conveyed by an interconnection gateway between a mobile communication network and a packet communication network, destined for the packet communication network, the method comprising a step of obtaining by a virtualized node an identifier of the service to which the packet relates. The method furthermore comprises:

a step of obtaining, on the basis of the service identifier, a sequence of at least one elementary network function so as to process the packet;

to process the packet, the first function of the sequence corresponding at the first iteration to a current function; the packet being transmitted as input of a virtualized node able to implement a current function:

application of the current function to the packet as input so as to obtain a packet as output by the virtualized node;

if there exists a function following the current function in the sequence:

selection of a next virtualized node able to implement the function following the current function in the sequence, the function then becoming current function;

dispatching of the output packet to the selected node, the output packet thus becoming input packet for the application of the current function;

if there does not exist any function following the current function in the sequence, transmission of the packet as output to the packet communication network.

The method allows flexible and dynamic control on the elementary network functions implemented in the mobile communication network of a telecommunication operator. This flexible and dynamic control of the elementary network functions is in particular rendered possible through the use of virtualized nodes for implementing these functions. A virtualized node is a virtualization of a computer resource. Such a node simulates by way of non-limiting example hardware and software resources of a computer device (e.g. a server), such as its memory, its processor, its hard disk, or else its operating system, and makes it possible to execute programs or more specifically to implement elementary network functions under the same conditions as those of the simulated device. Such a virtualized node is also known by the name "virtual machine".

The method thus makes it possible to implement the elementary network functions provided by the mobile communication network operator, while disregarding the hardware constraints which are generally associated with them in the known techniques of the prior art. The mobile communication network operator no longer needs dedicated hardware resources for the implementation of the elementary network functions. It is thus possible for the mobile communication network operator to use resources external to their own network in order to implement them. In particular, the mobile communication network operator no longer needs to mobilize resources continuously for each of the elementary network functions. They are mobilized as needed, in a dynamic manner, only for the elementary network functions that are necessary for the provision of the service to which the packet to be processed pertains.

Several elementary network functions can also advantageously be implemented on one and the same physical device. The capacities of such a physical device are then fully utilized, thereby reducing its non-usage rate. The management of the hardware resources used by the elementary network functions that are necessary for the provision of the service is thus optimized. This is manifested in particular by a saving in the hardware resources of the mobile communication network.

The implementation of elementary network functions by virtualized nodes also makes it possible to strengthen the integrity of the mobile communication network. The elementary network functions are implemented by isolated virtualized nodes. More precisely, an elementary network function can be implemented by several virtualized nodes, but a virtualized node can only implement a single elementary network function. Hence an incident occurring during the implementation of an elementary network function does not affect the other elementary network functions in progress to process a packet, nor does it affect the elementary network functions implemented for sessions parallel to the session to which a packet currently being processed pertains. Furthermore, the detection of errors is itself facilitated by partitioning the implementation of each elementary network function. In particular, it is easier to detect the source of an error.

The method makes it possible more specifically to apply the sequence of elementary network functions that is most suitable for the service. The elementary network functions are indeed not predefined in association with a given APN liable for example to be shared by several services, but they are on the contrary obtained on the basis of the service identifier of the processed packet. Only the elementary network functions necessary for the service to which the packet pertains are thus implemented. The sequence of elementary network functions implemented to process the packet can thus be customized as a function of the service.

The various modes or characteristics of embodiment mentioned hereinafter can be added independently or in combination with one another to the steps of the previously defined processing method.

According to a particular characteristic the application of the current function to the packet triggers an updating of the sequence of at least one elementary network function.

The updating of the sequence is carried out by modifying the sequence or by replacing the sequence with a new sequence. The method makes it possible to update the sequence of elementary network functions during its application to the packet. The method thus makes it possible to update the sequence of elementary network functions dynamically as a function of the result of a particular elementary network function applied to the packet. An elementary network function may for example be dedicated to the invoicing of bills in respect of a user subscribed to a premium video on demand service, and be in charge of verifying sufficient funding of an account of the user for access to this service. When the user's account is insufficiently funded, the elementary function can for example, rather than abruptly interrupt access to the service by generating an error, cause an updating of the sequence of elementary network functions implemented so as to offer continuity of the service with non-premium access. This dynamic configuration of the sequence of elementary network functions thus makes it possible to improve the client experience in respect of a requested service. It is stressed here that in the prior art techniques, a sequence of elementary network functions is predefined for a given APN and may not be modified during the processing of a packet. The method makes it possible to circumvent this constraint.

According to a particular characteristic the sequence is obtained on request, by the current node, from an elementary network functions control entity, the request comprising an identifier of the service.

The obtaining of the sequence from an elementary network functions control entity makes it possible to centralize and delegate the management of this updating to a third-party entity. The implementation of the method by each virtualized node is simplified.

A current node can dispatch a request comprising the service identifier to this control entity so as to request a sequence of elementary network functions.

According to a particular characteristic the processing method furthermore comprises a step of obtaining, from an elementary network functions control entity, a lookup table of correspondence between at least one service and a sequence of at least one elementary network function so as to process a packet relating to a service, upon the establishment of a user session between a user terminal and the interconnection gateway.

The obtaining of a lookup table of correspondence between services and sequences of elementary network functions to be applied to packets relating to these services during session establishment (e.g. during the creation of a PDP context) makes it possible not to subsequently invoke the elementary network functions control entity. It is not necessary for a virtualized node to dispatch an elementary network functions sequence request to the elementary network functions control entity systematically following the detection of a new service. The response times relating to a requested service are improved.

According to a particular characteristic the lookup table of correspondence is determined by the elementary network functions control entity as a function of a profile associated with the user terminal.

The profile associated with a user terminal makes it possible to determine a set of sequences of elementary network functions to be applied in respect of services, as a function of subscription information relating to a user of this user terminal. This makes it possible for example to provide certain elementary network functions as a function of services to which the user has subscribed.

According to a particular characteristic the method furthermore comprises a step of obtaining, from a virtualized nodes control entity, a list of virtualized nodes which are available and able to implement an elementary network function, and in which the next virtualized node is selected on the basis of said list.

The virtualized nodes control entity has an overview of the set of virtualized nodes and the elementary network functions that they implement, and more particularly of information relating to the availability of a node. The availability of a virtualized node refers to its capacity to be mobilized rapidly to implement an elementary network function. A list of virtualized nodes able to implement the elementary network functions can be obtained at any moment while processing the packet.

Virtualized nodes for implementing new elementary network functions are moreover readily configured by the virtualized nodes control entity. Access to new services does not require any modification of the infrastructure of the network of the mobile communication network operator.

The management of errors during the implementation of the method is furthermore facilitated. A new virtualized node able to implement an elementary network function can indeed rapidly be configured without moreover the sequence of elementary network functions to be applied to the packet being affected thereby.

According to a particular characteristic the method also comprises a step of dispatching, by the virtualized node implementing the current function, to a virtualized nodes control entity, a notification indicating a state of loading of the node.

The method makes it possible to support increases in loading of the elementary network functions. The method makes it possible to notify the virtualized nodes control entity that relays the information regarding overload at virtualized nodes implementing other elementary network functions. New virtualized nodes can be configured so as to implement the elementary network function of a saturated virtualized node, or of a virtualized node that has for example reached a predefined loading threshold. Such nodes may then not be invoked when processing a next data packet relating to the service, when selecting a virtualized node to implement an elementary network function of the sequence. The method makes it possible in particular to forestall congestion on input to or output from a virtualized node.

According to a second aspect the invention relates to a system for processing a packet, designed to process a data packet relating to a service, the packet being conveyed by an interconnection gateway between a mobile communication network and a packet communication network, destined for the packet communication network, the system comprising at least one virtualized node, said at least one virtualized node comprising:
  a first obtaining module, designed to obtain an identifier of the service to which the packet relates;
  a second obtaining module, designed to obtain, on the basis of the service identifier, a sequence of at least one elementary network function so as to process the packet; and the first function of the sequence corresponding at the first iteration to a current function:
  a processing module, designed to apply the current function to the input packet so as to obtain an output packet;
  a verification module, designed to verify whether there exists a function following the current function in the sequence;
  a selection module, designed to, when there exists a function following the current function in the sequence, select a next virtualized node designed to implement said function following the current function in the sequence; said function then becoming current function;
  a dispatching module; designed to, when there exists a function following the current function in the sequence, dispatch an output packet to a node selected by the selection module, the output packet thus becoming input packet for the application of the current function and designed to, when there does not exist any function following the current function in the sequence, transmit the output packet to the packet communication network.

The system proposes to exploit the advantages of the cloud computing model ("cloud computing" in English) by proposing an infrastructure as a service (or "Infrastructure as a service" in English) in which virtualized nodes implement the set of elementary network functions of a mobile communication network. An infrastructure as a service according to the cloud computing model consists in providing access to a virtualized computing pool. The network infrastructure of the mobile communication network operator is thus dematerialized. The proposed system thus makes it possible to mobilize elementary network functions and make them rapidly available, while reducing the costs of maintenance related to the infrastructure of the network.

The advantages stated elsewhere in respect of the processing method according to the first aspect are directly transposable to the system according to the second aspect.

According to a particular characteristic; the system also comprises in a user plane:
  at least one virtualized node able to implement an elementary network function so as to process the packet relating to a service;
and in a control plane:
  an elementary network functions control entity, designed to control the elementary network functions implemented by virtualized nodes belonging to the user plane, comprising:
    a first reception module, designed to receive, from a virtualized node implementing an elementary network function so as to process said packet, an elementary network functions sequence request, said request comprising an identifier of the service;
    an obtaining module, designed to obtain the sequence of at least one elementary network function so as to process the packet on the basis of the identifier of the service;
    a dispatching module; designed to dispatch to a virtualized node the sequence of at least one elementary network function so as to process the packet.

According to a particular characteristic, the system furthermore comprises a virtualized nodes control entity, designed to control said at least one virtualized node of the user plane, comprising:
  a collection module, designed to collect availability information in respect of at least one virtualized node, for the implementation of an elementary network function;
  a dispatching module, designed to dispatch to a virtualized node a list of virtualized nodes which are available and able to implement an elementary network function;
  an updating module, designed to update a list of virtualized nodes which are available and able to implement an elementary network function, the dispatching module then also being designed to dispatch an update of the list.

According to a particular characteristic, the elementary network functions control entity furthermore comprises:

a second reception module, designed to receive, from the interconnection gateway 10, information relating to a context shared between a user terminal that sent the data packet and the interconnection gateway. The dispatching module of the elementary network functions control entity then also being designed to dispatch at least one table storing at least one association between a service and a sequence of at least one elementary network function, to a virtualized node, upon the establishment of a user session between a user terminal and the interconnection gateway.

According to a particular characteristic, the elementary network functions control entity furthermore comprises:

a dispatching/reception module designed to obtain a user profile associated with the user terminal that sent the data packet. The obtaining module of the elementary network functions control entity is then also designed to obtain the sequence of at least one elementary network function on the basis of said user profile.

According to a particular characteristic, the virtualized nodes control entity furthermore comprises a reception module, designed to receive, from a virtualized node implementing an elementary network function, a notification indicating a state of saturation of the node, the node possibly no longer being able to implement the elementary network function during the processing of a next data packet relating to the service.

According to a third aspect, the invention also relates to a program for an elementary network functions control entity, comprising program code instructions intended to drive the execution of the steps of the previously described method that are implemented by an elementary network functions control entity, when said program is executed by the elementary network functions control entity and a recording medium readable by an elementary network functions control entity on which a program for an elementary network functions control entity is recorded.

The invention will be better understood with the aid of the following description of particular embodiments, with reference to the appended drawings in which:

FIG. 1 represents a system 300 for processing a packet relating to a service according to a particular embodiment. The system proposes more particularly an infrastructure as a service in which virtualized nodes implement a set of the elementary network functions of a mobile communication network 100.

Figures 1, 2A, 2B:
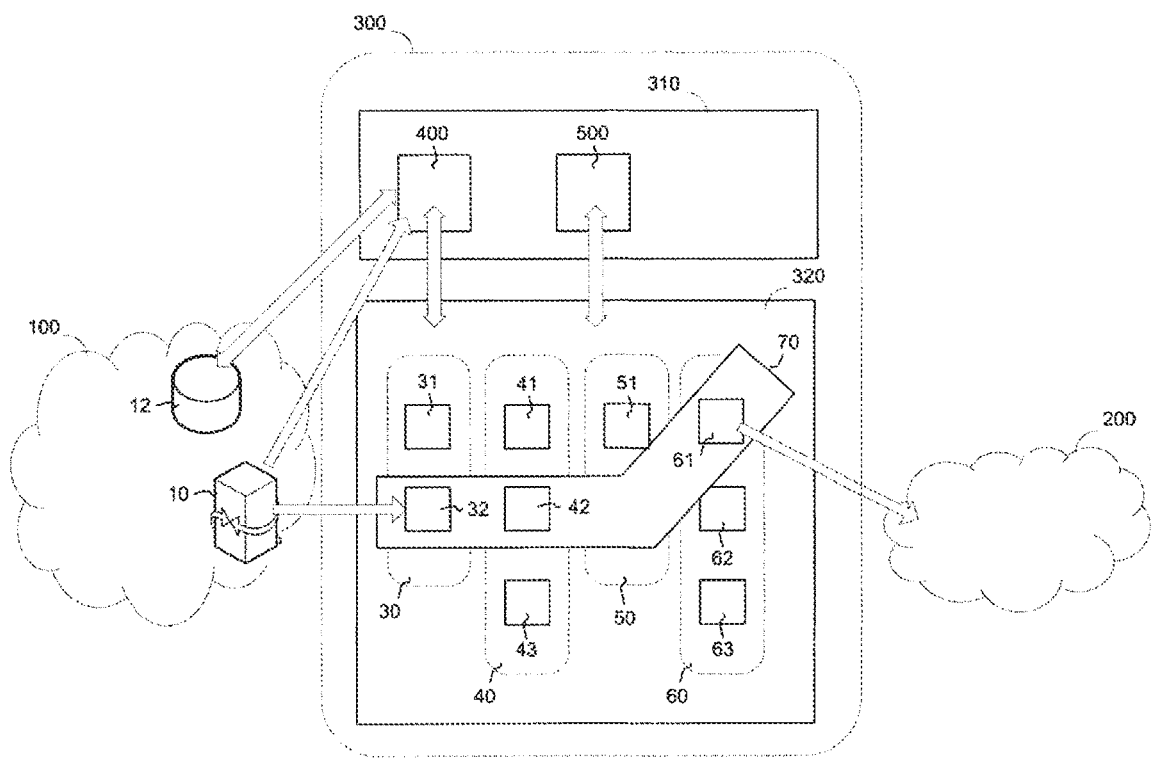
FIG. 1 represents a system for processing a packet relating to a service according to a particular embodiment.
FIGS. 2a and 2b represent tables storing available virtualized nodes that are able to implement elementary network functions according to a particular embodiment.

The elementary network functions correspond to functions provided by the operator of the mobile communication network 100 so as to process a data packet sent from an interconnection gateway to a network 200 of a service provider not managed by the mobile communication network operator. This entails by way of example network address translation services, firewall services, load distribution services, transcoding services, caching services, request-optimization services, or network packet enrichment services.

The packet to be processed is received at the input of the system 300 from an interconnection gateway 10 located in a mobile communication network 100. This interconnection gateway is by way of nonlimiting example a GGSN gateway or a P-GW gateway. The system 300 is either located in the network 100 or outside this network 100. In the latter case, the operator of the mobile communication network uses resources external to their network to process the packet.

The system 300 more specifically comprises entities belonging to a control plane 310 and the virtualized nodes belonging to a user plane 320. The control plane 310 itself comprises an elementary network functions control entity 400 and a virtualized nodes control entity 500. The elementary network functions control entity 400 and the virtualized nodes control entity 500 are dedicated devices server). In another embodiment these entities are modules integrated into a device of the network of the mobile communication network operator (e.g. interconnection gateway, router).

The elementary network functions control entity 400 is designed to associate sequences of elementary network functions implemented by the virtualized nodes belonging to the user plane 320. More particularly, a physical device is configured to support virtualized node devices. The operation of a virtualized node device is simulated with the aid of software on the physical device. The elementary network functions control entity 400 determines the sequences of elementary network functions to be applied to a data packet and provides them to the virtualized nodes of the user plane 320. The sequences to be applied to a packet are more particularly determined as a function of information relating to a context shared between a user terminal (e.g. portable telephone, laptop computer, tablet) and the interconnection gateway 10, and of information regarding the subscription of a user of a user terminal that sent this packet.

The information relating to a context (e.g. PDP context or "EPS bearer" connection) is received by the elementary network functions control entity 400 from the interconnection gateway 10. The context comprises information relating to the terminal such as an IMSI for "International Mobile Subscriber Identity" identifier, a network access type (e.g. 2G or 3G), or else information regarding quality of service. A set of sequences of elementary network functions to be applied to data packets sent by the user terminal can thus be determined as a function of an IP (for "Internet Protocol") address allocated to the user terminal in the mobile communication network 100, of the network access type, of information regarding quality of service, or else of a combination of these various criteria.

The subscription information is for example obtained by the elementary network functions control entity from a database 12 of user profiles (e.g HSS device for "Home Subscriber Server") located in the mobile communication network 100. This information comprises in particular a list of services to which the user is subscribed. A set, predefined by the operator of the mobile communication network 100, of sequences of elementary network functions can thus be determined for the services to which the user is subscribed.

The virtualized nodes control entity 500 manages for its part the virtualized nodes for the implementation of the elementary network functions. The virtualized nodes control entity 500 obtains real-time information about the virtualized nodes of the user plane. This information relates for example to the availability of the virtualized nodes to implement an elementary network function or else a state of loading of each virtualized node.

In a particular embodiment, the virtualized nodes control entity 500 communicates this information to the elementary network functions control entity 400. The elementary network functions control entity 400 is thus informed of the availabilities of the virtualized nodes to implement a given elementary network function.

The control plane 310 therefore ensures a control on the virtualized nodes 31-32, 41-43, 51, 61-63 of the user plane 320. These virtualized nodes 31-32, 41-43, 51, 61-63 implement elementary network functions 30, 40, 50, 60, to be applied to a packet as a function of a service to which the packet pertains. More precisely, the elementary network function 30 is implemented by the virtualized nodes 31, 32; the elementary network function 40 by the virtualized nodes 41, 42, 43; the elementary network function 50 by the node 51; and the elementary network function 60 by the virtualized nodes 61, 62, 63. The elementary network function 30 makes it possible for example to perform load distribution, the elementary network function 40 is a firewall service, and the elementary network function 50 makes it possible to perform packet enrichment. The elementary network function 60 makes it possible for example to perform network address translation. It is assumed here that the packet relates to an Internet access service provided by the packet communication network 200. Access to the service requires in particular the application to the packet of several elementary network functions in a particular order. It is assumed in the embodiment described that the operator of the mobile communication network has configured, in respect of an Internet access service, the following elementary network functions: load distribution between several firewall services, followed by network address translation. The elementary network functions 30, 40 and 60 are then applied successively to the packets relating to the Internet access service so as to access it. These elementary network functions 30, 40 and 60 form a sequence 70 of elementary network functions implemented respectively by the virtualized nodes 32, 42 and 61, and to be applied to the packet received as input of the system 300.

Only four elementary network functions are represented in the user plane, no limitation exists, however, as regards the number of elementary network functions implemented in the user plane 320. Likewise only nine virtualized nodes are represented in the user plane, no limitation exists, however, as regards the number of virtualized nodes belonging to this plane.

The association between an elementary network function and the available virtualized nodes implementing it is stored by each virtualized node in an NVAT table. This table will now be described in relation FIGS. 2a and 2b. More precisely, the NVAT table of a virtualized node V stores the virtualized nodes able to implement the elementary network functions which, in a sequence, follow the elementary network function implemented by this node V. By way of example, it is assumed in this embodiment that three sequences of elementary network functions have been predefined by the operator of the mobile communication network 100: the sequences of elementary network functions 30-40-60, 30-50-60 and 30-60. FIG. 2a represents the content of an NVAT table stored by the virtualized nodes 31 and 32 which implement the elementary network function 30. Each row of this NVAT table consists of an identifier of an elementary network function in association with a list of available virtualized nodes that are able to implement it. In the sequences of elementary network functions 30-40-60, 30-50-60 and 30-60, the elementary network functions which immediately follow the elementary network function 30 are the elementary network functions 40, 50 and 60. The content of the NVAT table for the nodes 31 and 32 which implement the elementary network function 30 therefore comprises one row for each elementary network function 40, 50 and 60. The first row indicates that the virtualized nodes 41, 42 and 43 are available and able to implement the elementary network function 40. The second row indicates that the virtualized node 51 is available and able to implement the elementary network function 50. And the last row indicates that the virtualized nodes 61, 62 and 63 are available and able to implement the elementary network function 60. Likewise, in the three sequences 30-40-60, 30-50-60 and 30-60, the elementary network functions 40 and 50 are followed by the elementary network function 60. The NVAT table, such as described in conjunction with FIG. 2b, for the virtualized nodes implementing the elementary network functions 40 and 50 therefore comprises a single row indicating that the virtualized nodes 61, 62 and 63 are available and able to implement the elementary network function 60. The tables are updated dynamically by the virtualized nodes control entity 500 as a function of the information collected by the latter. Virtualized nodes can readily be configured or deconfigured by the virtualized nodes control entity 500 as a function for example of a state of loading noted for an elementary network function. New nodes are thus configured to implement an elementary network function when the nodes already implementing it no longer suffice to process the whole set of packets to which the function is applied. The NVAT tables comprising an elementary network function implemented by a saturated virtualized node are for example updated by broadcasting of an updating message by the virtualized nodes control entity 500. The saturated virtualized node is then deleted or replaced in these NVAT tables by a new node.

Figure 3:
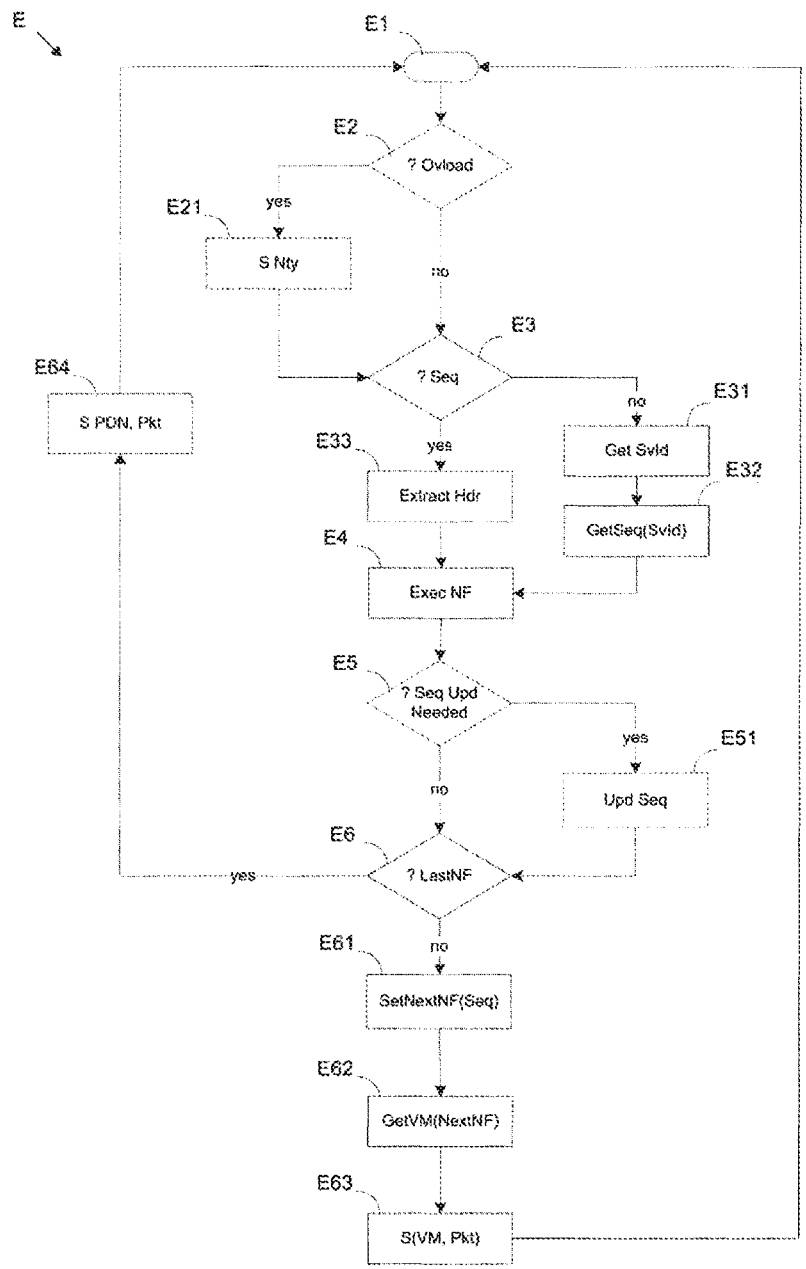
FIG. 3 represents the steps of the processing method according to a particular embodiment.

FIG. 3 represents the steps of the method of processing a packet relating to a service according to a particular embodiment.

A current virtualized node of the system 300 is during a step E1 on standby awaiting a data packet. The method starts with the reception of a data packet P relating to a service from the interconnection gateway 10.

During a step E2, the current node verifies a state of loading giving an indication about the calculation resources that it uses.

When this state of loading (e.g. processor loading) exceeds a threshold, corresponding for example to a pre-congestion state; a notification is dispatched during a step E21 to a virtualized nodes control entity 500. This notification allows the virtualized nodes control entity to delete this saturated virtualized node from the NVAT table of the other virtualized nodes for the processing of next data packets. New virtualized nodes can also be created to implement the elementary function and added to the NVAT table of the other virtualized nodes The virtualized nodes for which a modification of the NVAT table is carried out comprise for example all the other virtualized nodes or just the virtualized nodes implementing an elementary network function preceding the elementary network function implemented by the saturated node. Step E21 is thereafter followed by step E3.

In the case where the state of loading does not exceed the threshold, the method goes directly from step E2 to step E3.

During step E3, the current node verifies that the data packet P comprises a header containing a sequence of elementary network functions.

When the data packet does not contain such a header, the current node analyzes, during a step E31, the data packet P received so as to identify a service to which the packet pertains. This analysis uses for example a technique for inspecting the packets in depth (Deep Packet Inspection in English). The identified service is for example a Voice over IP service.

In a step E32, the current node obtains a sequence of elementary network functions to be applied to the packet P as a function of the service identified in step E31. The current node accordingly dispatches a request comprising an identifier of the service to the elementary network functions control entity 400. The elementary network functions control entity 400 then returns the sequence to the current node. This sequence is provided in the form of an elementary network functions identifier list, or else in the form of an identifier of a list of elementary network functions making it possible to obtain a list of elementary network functions previously configured by the operator of the mobile communication network 100 at the level of the virtualized nodes.

In another embodiment, the association between a service and a sequence of elementary network functions is provided by a third-party entity during the creation of a user session between a user terminal and an interconnection gateway 10 (e.g. creation of a PDP context, or of an "EPS bearer" connection). This entity is for example the elementary network functions control entity 400. The lag introduced by the exchange with the elementary network functions control entity 400 can thus be reduced.

Once the sequence of elementary network functions has been obtained in step E32, the method goes to a step E4.

When in step E3 the header of the packet already comprises a sequence of elementary network functions, the method goes to a step E33, during which the current node extracts the header of the packet and stores it, before going to step E4.

In step E4, the current node has a sequence of elementary network functions for the service to which the packet P pertains. By way of example, this sequence S consists of the elementary network functions 30, 40 and 60, described previously in conjunction with FIG. 1. The current node then implements its elementary network function as current function on the packet.

In a step E5, the current node verifies whether following the application of the current function, an updating of the sequence of elementary network functions is necessary. A new sequence of elementary network functions can for example advantageously be obtained as a function of the result of the application of the current function to the data packet P in step E4. In the case for example of an elementary network function tasked with the invoicing of bills of a user terminal wishing to access a service for which a user of the terminal no longer has any credit, a new sequence of elementary network functions can be obtained so as to redirect the user traffic to another service (e.g. reloading portal).

This updating is carried out during a step E51, by replacement or modification of the sequence of elementary network functions that was obtained in step E32, or if appropriate of the sequence stored in step E33. The expressions "new sequence" and "updated sequence" can therefore be used interchangeably in the subsequent description. The obtaining of a new sequence of elementary network functions is carried out according to one of the various embodiments described previously for the implementation of step E32.

A step E6 thereafter follows step E51 or is directly implemented after step E5 when no updating of the sequence is necessary. During this step E6, the current node verifies whether the current function is the last elementary network function of the sequence.

When the current function is not the last elementary network function of the sequence, the current node updates the sequence of elementary network functions during a step E61. Accordingly the current node deletes the first elementary network function of the sequence. The new sequence comprises solely the elementary network functions which have not yet been applied to the packet, and the current function then corresponds to the next elementary network function to be implemented. A header comprising the new sequence is then added to the data packet P.

In another embodiment, in step E61, the sequence is not modified, and the current function is designated by a pointer making it possible to indicate the next elementary network function of the sequence to be implemented. The header added to the data packet in step E61 then also comprises this pointer. A virtualized node to which the data packet is subsequently transmitted can thus have a history of the elementary network functions implemented.

During a step E62, the current node consults its NVAT table which enables it to select a next virtualized node, so as to implement the next function. The selection of the next virtualized node can be random or follow a particular policy defined by the operator of the mobile communication network. It is assumed here that this selection is random.

During a step E63, the data packet P is dispatched to the node selected in step E62 to implement the next function.

The virtualized node becomes in its turn "current node" when it receives the data packet P. The steps of the method will then be repeated by this new current node, and the data packet P transmitted from node to node until the whole set of functions of the sequence has been applied. It is moreover stressed that the virtualized node goes back to step E1, on standby awaiting a new data packet to be processed, when the packet has been transmitted during step E63 to the next node.

In step E6, when the current function is the last elementary network function of the sequence, the current node transmits, during a step E64, the packet to the packet communication network 200 providing the service to which this packet pertains. This ends the processing of the data packet P. The virtualized node then places itself back on standby awaiting a next data packet (step E1).

No limitation exists as regards the communication protocol used in dispatching the packet from one virtualized node to another virtualized node. These communication protocols are for example the HTTP (for Hypertext Transfer Protocol), FTP (for File Transfer Protocol) protocols, etc.

Steps E2 and E21 can moreover be carried out subsequent to any other step of the method. It is thus possible to control the state of loading of a node at various instants of the method.

Steps E5 and E51 are used only if sequence modification is envisaged by a mobile communication network operator.

The method has been described with an implementation relying on tables to represent the associations between services, sequences, elementary network functions and virtualized nodes. No limitation exists, however, as regards the data structures used for the implementation of the method.

It is also stressed that the method can equally well be applied to the processing of data packets of streams sent from the interconnection gateway 10 to the packet communication network 200, as to the processing of data packets of streams sent from the packet communication network 200 to the interconnection gateway 10. In the latter case the virtualized input node is adapted for receiving data packets from the packet communication network 200.

An exemplary implementation of the method for the processing of a packet relating to an Internet access service will now be described.

The method starts with the reception of a data packet P relating to the Internet access service by a current node 32 during step E1.

The current node not being saturated (step E2), it verifies in step E3 whether the data packet P includes a header comprising a sequence of elementary network functions.

The data packet P not including any header comprising a sequence of elementary network functions, the current node 32 analyzes during step E31 the data packet P received and identifies that the service to which the packet pertains is an Internet access service.

In step E32, the current node obtains a sequence of elementary network functions S={30; 40; 60} to be applied to the service identified in step E31. This sequence is stored by the current node 32.

In step E4, the current node 32 implements the current function 30 on the packet.

During step E5, no modification of the sequence S is necessary following the application of current function 30.

The current node 32 then verifies during step E6 whether the current function 30 is the last elementary network function of the sequence S. The elementary network function 30 not being the last of the sequence S, the virtualized node 32 updates the sequence of elementary network functions during step E61. Accordingly the virtualized node 32 deletes the first elementary network function of the sequence, the new sequence is therefore S={40; 60}. The current node 32 adds to the processed packet a header consisting of the identifier of the Internet access service and of the sequence S of elementary network functions to be applied to the packet. The current function; first elementary network function of the sequence S, is now the elementary network function 40.

During step E62, the current node 32 consults its NVAT table. The NVAT table indicates three available virtualized nodes that are able to implement the current function 40: the virtualized nodes 41, 42 and 43. The selection of the node to implement the current function 40, or current node, is random. The virtualized node 42 is selected as current node.

During step E63; the packet is dispatched to the current node 42 selected in step E62. The virtualized node 32 places itself back on standby awaiting a next data packet to be processed.

The virtualized node 42 becomes in its turn current node; and steps E1 to E63 are repeated by the latter node.

The data packet P is then received by the current node 42 during step E1.

The current node not being saturated, it verifies in step E3 whether the data packet P includes a header comprising a sequence of elementary network functions.

The data packet P including a header comprising the sequence S={40; 60}, the current node 42 extracts the header comprising the sequence S during step E33, stores it and implements, during step E4, the current function 40.

During step E5, no modification of the sequence S is necessary following the application of current function 40.

The current node 42 then verifies during step E6 whether the current function 40 is the last elementary network function of the sequence S. The elementary network function 40 not being the last of the sequence S, the virtualized node 42 updates the sequence of elementary network functions during step E61. Accordingly the virtualized node 42 deletes the first elementary network function of the sequence, the new sequence is therefore S={60}. The current node 42 adds to the processed packet a header consisting of the identifier of the Internet access service and of the sequence S of elementary network functions to be applied to the packet. The current function, first elementary network function of the sequence S, is now the elementary network function 60.

During step E62, the current node 42 consults its NVAT table. The NVAT table indicates three available virtualized nodes that are able to implement the current function 60: the virtualized nodes 61; 62 and 63. The selection of the node to implement the current function 60, or current node, is random. The virtualized node 61 is selected as current node.

During step E63, the packet is dispatched to the current node 61 selected in step E62. The virtualized node 42 places itself back on standby awaiting a next data packet to be processed.

The virtualized node 61 becomes in its turn current node; and steps E1 to E63 are repeated by the latter node.

The data packet P is then received by the current node 61 during step E1.

The current node not being saturated, it verities in step E3 whether the data packet P includes a header comprising a sequence of elementary network functions. The data packet P including a header comprising the sequence S={60}, the current node 61 extracts the header comprising the sequence S during step E33, stores it and implements, during step E4, the current function 60.

During step E5, no modification of the sequence S is necessary following the application of current function 60.

The current node 61 then verifies during step E6 whether the current function 60 is the last elementary network function of the sequence S. The elementary network function 60 being the last of the sequence S, the virtualized node 61 transmits (E64) the data packet P to the packet communication network providing the requested service, and the virtualized node 61 places itself back on standby awaiting a next data packet to be processed.

Figure 4:
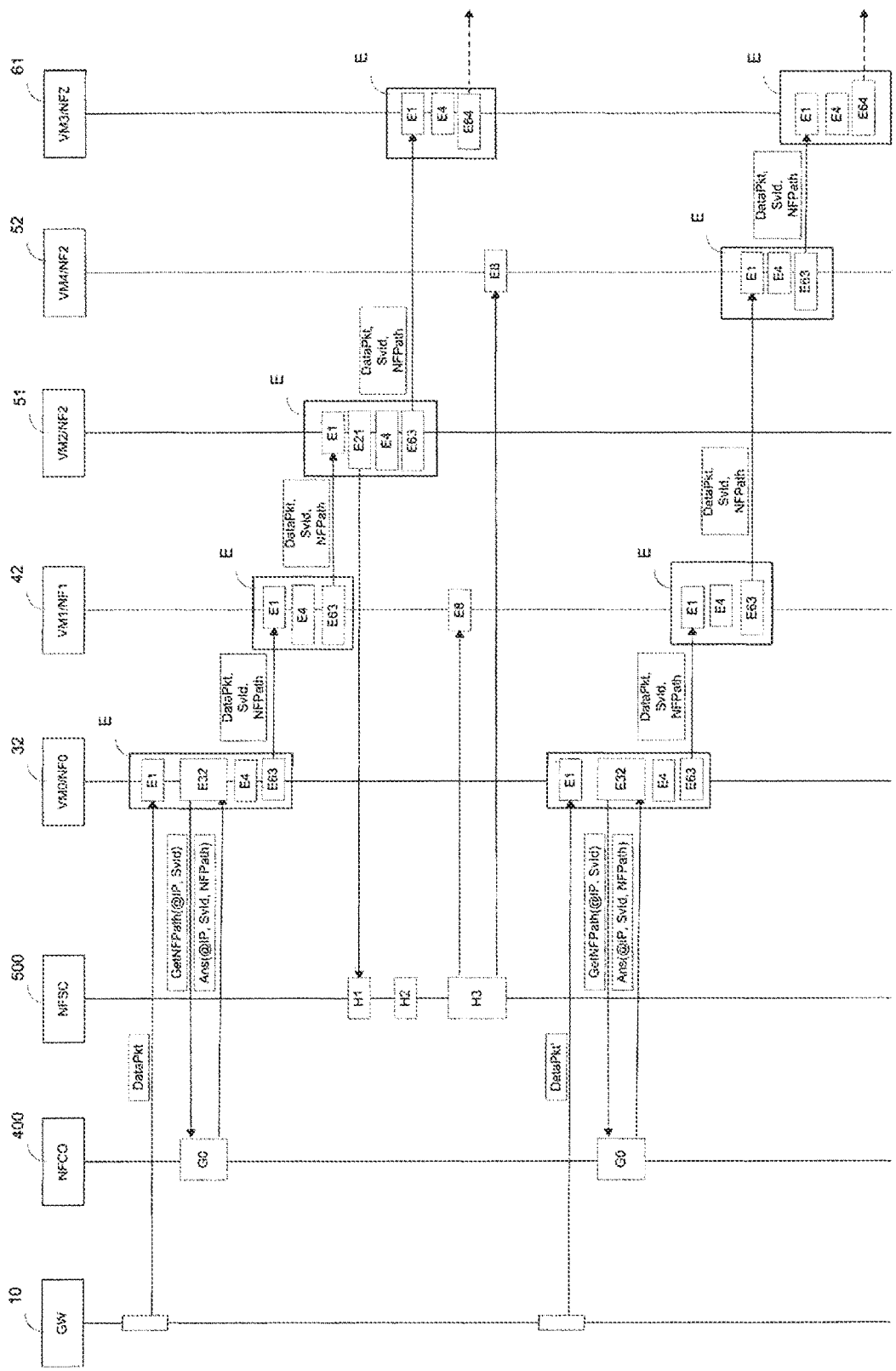
FIG. 4 represents the exchanges between the entities of a system for processing a packet relating to a service in case of unavailability of a node of the system, according to a particular embodiment.

The exchanges between the entities of a system for processing a data packet relating to a service in case of unavailability of a node of the system 300 according to a particular embodiment will now be described in conjunction with FIG. 4.

During a step E1, a virtualized node 32 implementing an elementary network function 30 receives a data packet relating to a service originating from the interconnection gateway 10.

In a step E32, the virtualized node 32 obtains a sequence of elementary network functions to be applied to the packet as a function of the service from an elementary network functions control entity 400. The virtualized input node 32 accordingly dispatches a request comprising an identifier of the service to the elementary network functions control entity 400. The elementary network functions control entity 400 then returns, during a step G0, the sequence to the virtualized input node 32. The returned sequence is by way of example a sequence consisting of the elementary network functions 40, 50 and 60, S={40; 50; 60}. In a step E4, the virtualized input node 32 implements the elementary network function 30 on the packet.

During a step E63, the data packet is dispatched to the virtualized node 42 selected in step E62 to implement the elementary network function 40.

The data packet is received by the virtualized node 42 in a step E1. The virtualized node then implements during a step E4 the elementary network function 40. Next it transmits in its turn, during a step E63, the data packet to the virtualized node 51 selected to implement the elementary network function 50.

The virtualized node 51 receives in its turn in a step E1 the data packet.

In a step E21, a calculational loading threshold indicating that the virtualized node 51 cannot implement its elementary network function to process a next data packet is reached. The virtualized node 51 then notifies it to a virtualized nodes control entity 500.

The virtualized nodes control entity 500 receives the notification during a step H1 and determines in a step H2 whether there is a need to create a new virtualized node to implement the elementary network function 50. By way of example the virtualized node 52 is created to implement the elementary network function 50. In a step H3, the virtualized nodes control entity 500 then transmits to the virtualized nodes whose NVAT table comprises a reference to the virtualized node 51, by way of example the virtualized nodes 41, 42 and 43, a message in respect of updating of their NVAT table.

In a step E5, the virtualized nodes 41, 42 and 43 receive the message in respect of updating of their NVAT table. The virtualized nodes 41, 42 and 43 then replace the reference to the virtualized node 51 by a reference to the virtualized node 52.

In parallel with the updating of the NVAT tables, the processing of the data packet continues. In a step E4, the virtualized input node 51 implements the elementary network function 50 on the packet. Then transmits it to the virtualized node 61 during a step E63.

The latter virtualized node 61 receives the data packet in a step E1, implements during a step E4 the elementary network function 60 on the packet, and then transmits it during a last step E64 to a packet communication network 200.

When a second data packet relating to the same service is received by the virtualized node 32, the method steps implemented by the virtualized nodes 32, 42 and 61 remain identical to what was described previously, except that when the virtualized node 42 receives this second data packet in step E1, the packet is transmitted at the end of the processing to the virtualized node 52. It is the latter virtualized node 52 which then applies the current function 50 to the data packet before transmitting the latter to the virtualized node 61. The current function 50 thus has sufficient resources to continue to be implemented.

In another embodiment, no notification is dispatched when a virtualized node reaches a certain loading level. The availability of the virtualized nodes to implement an elementary network function is verified by the virtualized nodes control entity 500 by dispatching a message (e.g. so-called "KeepAlive" messages) at regular intervals to the virtualized nodes. The virtualized nodes thus respond by dispatching a state of their current loading. When a virtualized node does not respond to one of these messages, it is considered to be no longer available for the implementation of its elementary network function.

In another embodiment, the sequences of elementary network functions by type of service are provided by the elementary network functions control entity 400 during the creation of the user session (e.g. PDP Context, EPS bearer). Step E32 then corresponds to an obtaining of the sequence relating to the identified service, which sequence is stored locally by the virtualized node during the creation of the user session.

Figure 5:
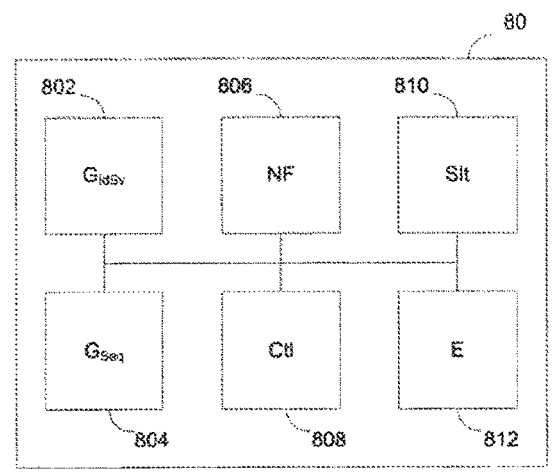
FIG. 5 represents a virtualized node of a system for processing a packet relating to a service according to a particular embodiment.

FIG. 5 represents a virtualized node 80 of a system 300 for processing a packet relating to a service according to a particular embodiment. Such a virtualized node 80 comprises:

a first obtaining module 802, designed to obtain an identifier of the service to which the packet relates;

a second obtaining module 804, designed to obtain, on the basis of the service identifier, a sequence of at least one elementary network function so as to process said packet; and the first function of the sequence corresponding at the first iteration to a current function:

a processing module 806, designed to apply the current function to the input packet so as to obtain an output packet;

a verification module 808, designed to verify whether there exists a function following the current function in the sequence, and if appropriate, a selection module 810, designed to, when there exists a function following the current function in the sequence, select a next virtualized node designed to implement said function following the current function in the sequence, said function then becoming current function;

a dispatching module 812, designed to, when there exists a function following the current function in the sequence, dispatch an output packet to a node selected by the selection module 810, the output packet thus becoming input packet for the application of the current function and designed to, when there does not exist any function following the current function in the sequence, transmit the output packet to a packet communication network.

Figure 6:
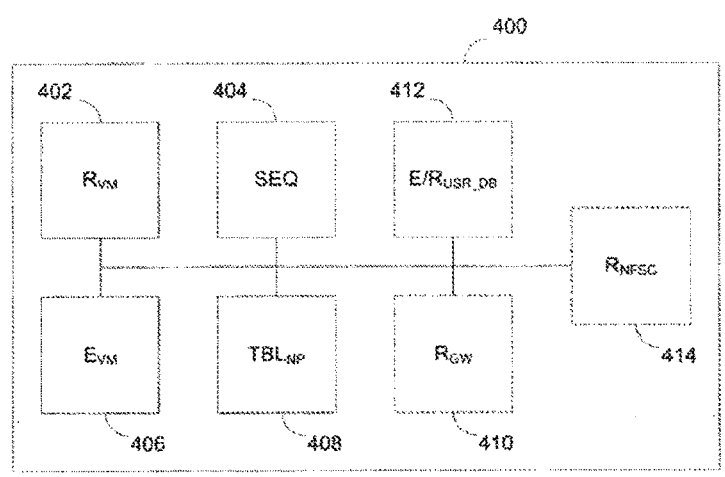
FIG. 6 represents an elementary network functions control entity according to a particular embodiment.

An elementary network functions control entity 400 will now be described in conjunction with FIG. 6. The elementary network functions control entity 400 is designed to control sequences of elementary network functions implemented by virtualized nodes. These elementary network functions are intended to be applied to a data packet to be processed relating to a service. The elementary network functions control entity 400 comprises:

a first reception module 402, designed to receive, from a virtualized node implementing an elementary network function so as to process the packet, an elementary network functions sequence request, the request comprising an identifier of the service;

at least one table 408, designed to store at least one association between a service and a sequence of at least one elementary network function;

an obtaining module 404, designed to obtain from the table 408 the elementary network function sequence so as to process the packet on the basis of the identifier of the service;

a dispatching module 406, designed to dispatch to a virtualized node the sequence of at least one elementary network function so as to process the packet.

In another embodiment, the elementary network functions control entity 400 comprises a second reception module 410, designed to receive, from an interconnection gateway 10; information relating to a context shared between a user terminal that sent the data packet and this interconnection gateway 10. The dispatching module 406 is then also designed to dispatch the table 408 to a virtualized node, upon the establishment of a user session (e.g. PDP context, or EPS bearer), between a user terminal and the interconnection gateway. In this embodiment, the obtaining module 404 can also be designed to obtain the sequence of at least one elementary network function on the basis of the information relating to the context shared between the user terminal and the interconnection gateway 10.

In another embodiment, the elementary network functions control entity 400 comprises a dispatching/reception module 412 designed to obtain a user profile associated with the user terminal that sent the data packet. The obtaining module 404 is then also designed to obtain the elementary network function sequence on the basis of the user profile.

In another embodiment, the elementary network functions control entity 400 comprises a third reception module 414, designed to receive from a virtualized nodes control entity 500 availability information in respect of at least one virtualized node for the implementation of an elementary network function of the sequence.

Furthermore no limitation exists as regards the data structures used to store an association between a service and a sequence of at least one elementary network function.

Figure 7:
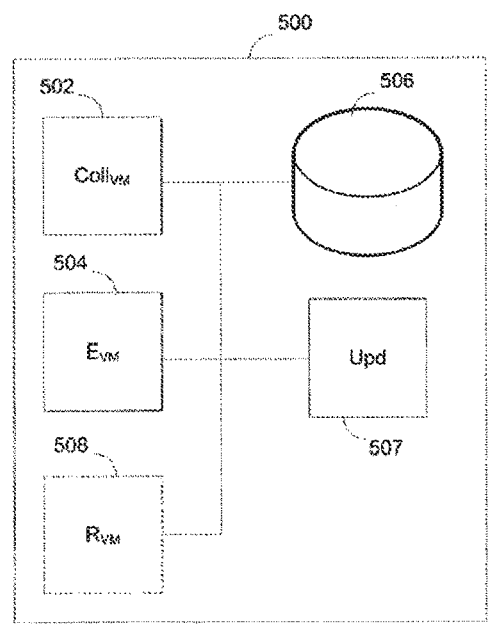
FIG. 7 represents a virtualized nodes control entity according to a particular embodiment.

A virtualized nodes control entity 500 will now be described in conjunction with FIG. 7. A virtualized nodes control entity 500 is moreover designed to control at least one virtualized node of a user plane. It comprises:
a collection module 502; designed to collect availability information in respect of at least one virtualized node, for the implementation of an elementary network function;
a dispatching module 504, designed to dispatch to a virtualized node a list of virtualized nodes which are available and able to implement an elementary network function;
at least one table 506, designed to store the availability information in respect of at least one virtualized node for the implementation of an elementary network function;
an updating module 507; designed to update a list of virtualized nodes which are available and able to implement an elementary network function, the dispatching module then also being designed to dispatch an update of the list.

In a particular embodiment, the virtualized nodes control entity comprises a reception module 508, designed to receive, from a virtualized node implementing an elementary network function, a notification indicating a state of saturation of the node, the node possibly no longer being able to implement the elementary network function during the processing of a next data packet relating to the service.

In another particular embodiment, the reception module 508 receives a notification indicating a state of saturation of the node, via an entity, not represented, which has an overview regarding the availability of the set of virtualized nodes of the system 300.

In another particular embodiment, the dispatching module 504 is also designed to dispatch a message (e.g. so-called "KeepAlive" messages) at regular intervals to the virtualized nodes so as to obtain a state of loading of the virtualized nodes.

The invention is implemented by means of software and/or hardware components. In this regard, the term "module" can correspond in this document either to a software component, or to a hardware component or to a set of hardware and/or software components, able to implement a function or a set of functions, according to what is described previously in respect of the module concerned.

A software component corresponds to one or more computer programs, one or more subprograms of a program, or more generally to any element of a program or of a piece of software. Such a software component is stored in memory and then loaded and executed by a data processor of a physical entity and is able to access the hardware resources of this physical entity (memories, recording media, communication buses, electronic input/output cards, user interfaces, etc.).

In the same manner, a hardware component corresponds to any element of a hardware set. It may or may not entail a programmable hardware component, with or without integrated processor for software execution. It entails for example an integrated circuit, a chip card, an electronic card for the execution of firmware, etc.

In a particular embodiment, the modules 402, 404, 406, 408, 410, 412, and 414 are designed to implement the processing method described previously. This preferably entails software modules comprising software instructions for executing those of the steps of the previously described processing method that are implemented by a control entity. The invention therefore also relates to:
a program for a control entity, comprising program code instructions intended to drive the execution of the steps of the previously described processing method when said program is executed by said entity;
a recording medium readable by a control entity and on which the program for such an entity is recorded.

The software modules can be stored in or transmitted by a data medium. The latter can be a hardware storage medium, for example a CD-ROM, a magnetic diskette or a hard disk, or else a transmission medium such as an electrical, optical or radio signal, or a telecommunication network.

The invention claimed is:

1. A method of processing a data packet relating to a service, said packet being conveyed by an interconnection gateway (10) between a mobile communication network (100) and a packet communication network (200), destined for said packet communication network, said method comprising following acts performed by a virtualized node (32):
analyzing the received data packet and based on this analysis, obtaining an identifier of the service to which the packet relates;
characterized in that said method furthermore comprises:
obtaining on request, said request comprising the service identifier, from an elementary network functions control entity, a sequence (70) in the form of at least one elementary network function (30, 40, 60) list so as to process said packet;
to process the packet, the first network elementary function (30) of the sequence corresponding at the first iteration to a current function, the packet being transmitted as input of the virtualized node (32, 42, 61) able to implement the current function:
applying (E4) of the current function to the packet as input so as to obtain a packet as output by the virtualized node (32);
if there exists (E6) a next function (40) following the current function in the sequence:
selecting (E61, E62) of a next virtualized node (42) able to implement said next function (40) following the current function in the sequence, said next function (40) then becoming current function;
dispatching (E63) of the output packet to the next selected virtualized node (42), the output packet thus becoming input packet for the application of the current function;
if there does not exist (E6) any next function (40) following the current function in the sequence, transmitting (E64) of the packet as output to the packet communication network.

2. The processing method according to claim 1, in which the application of the current function to the packet triggers an updating of said sequence of at least one elementary network function.

3. The processing method according to claim 1, furthermore comprising an step act of obtaining, from the elementary network functions control entity, a lookup table of correspondence between at least one the service and the sequence of at least one elementary network function so as to process a packet relating to the service, upon the establishment of a user session between a user terminal and the interconnection gateway.

4. The processing method according to claim 3, in which said lookup table of correspondence is determined by the elementary network functions control entity as a function of a profile associated with the user terminal.

5. The processing method according to claim 1, furthermore comprising an step act of obtaining, from a virtualized nodes control entity, a list of virtualized nodes which are available and able to implement an elementary network function, and in which the next virtualized node is selected on the basis of said list.

6. The processing method according to claim 1, furthermore comprising an act of dispatching, by the virtualized node implementing the current function, to a virtualized nodes control entity, a notification indicating a state of loading of the node.

7. A system (300) for processing a packet, designed to process a data packet relating to a service, said packet being conveyed by an interconnection gateway (10) between a mobile communication network (100) and a packet communication network (200), destined for said packet communication network, said system comprising at least one virtualized node (31-32, 41-43, 51, 61-63, 80), said at least one virtualized node comprising at least one hardware component configured to:
analyzing the received data packet and based on this analysis, obtain an identifier of the service to which the packet relates;
obtain on request, said request comprising the service identifier, from an elementary network functions control entity, a sequence in the form of at least one elementary network function list so as to process said packet;
and the first network elementary function of the sequence corresponding at the first iteration to a current function:
apply the current function to the input packet so as to obtain an output packet;
verify whether there exists a next function following the current function in the sequence, and if appropriate,
select, when there exists a next function following the current function in the sequence, a next virtualized node designed to implement said function following the current function in the sequence, said next function then becoming current function;
dispatch, when there exists a next function following the current function in the sequence, an output packet to a node selected by the selection module, the output packet thus becoming input packet for the application of the current function and designed to, when there does not exist any next function following the current function in the sequence, to transmit the output packet to the packet communication network.

8. The system according to claim 7, comprising in a user plane (320):
at least one virtualized node (31-32, 41-43, 51, 61-63) able to implement an elementary network function (30, 40, 50, 60) so as to process the packet relating to a service;
and in a control plane (310):
an elementary network functions control entity (400), designed to control the elementary network functions implemented by virtualized nodes belonging to the user plane, comprising at least one hardware component configured to:
receive, from a virtualized node implementing an elementary network function so as to process said packet, an elementary network functions sequence request, said request comprising an identifier of the service;
obtain the sequence in the form of at least one elementary network function list so as to process the packet on the basis of the identifier of the service;
dispatch to a virtualized node the sequence in the form of at least one elementary network function list so as to process the packet.

9. The system according to claim 7, furthermore comprising a virtualized nodes control entity (500), designed to control said at least one virtualized node of the user plane, comprising at least one hardware component configured to:
collect availability information in respect of at least one virtualized node, for the implementation of an elementary network function;
dispatch to a virtualized node a list of virtualized nodes which are available and able to implement an elementary network function;
update a list of virtualized nodes which are available and able to implement an elementary network function, the dispatching module then also being designed to dispatch an update of the list.

10. The system according to claim 7, in which the elementary network functions control entity furthermore comprises at least one hardware component configured to:
receive, from the interconnection gateway 10, information relating to a context shared between a user terminal that sent the data packet and said interconnection gateway;
dispatch at least one table storing at least one association between a service and a sequence in the form of at least one elementary network function list, to a virtualized node, upon the establishment of a user session between a user terminal and the interconnection gateway.

11. The system according to claim 8, in which the elementary network functions control entity (400) furthermore comprises at least one hardware component configured to:
obtain a user profile associated with the user terminal that sent the data packet;
obtain the sequence in the form of at least one elementary network function list on the basis of said user profile.

12. The system according to claim 7, in which the virtualized nodes control entity furthermore comprises at least one hardware component configured to a reception module (508), designed to receive, from a virtualized node implementing an elementary network function, a notification indicating a state of saturation of the node, said node possibly no longer being able to implement the elementary network function during the processing of a next data packet relating to the service.

13. A non-transitory computer-readable recording medium readable by an elementary network functions control entity on which comprising a program is recorded, the program for an elementary network functions control entity, comprising program code instructions intended to drive execution of steps of a method that are implemented by an elementary network functions control entity, when said program is executed by said entity, the method comprising:
- transmitting an identifier of a service for receipt based on analysis of a data packet; and
- transmitting a lookup table of correspondence between at least one service and a sequence in the form of at least one elementary network function list so as to process a packet relating to a service, upon the establishment of a user session between a user terminal and the interconnection gateway;

in which said lookup table of correspondence is determined by the elementary network functions control entity as a function of a profile associated with the user terminal.

* * * * *